United States Patent
Nguyen et al.

(10) Patent No.: US 12,223,343 B2
(45) Date of Patent: Feb. 11, 2025

(54) QUANTUM PROCESS PARALLELIZATION

(71) Applicant: The Boeing Company, Chicago, IL (US)

(72) Inventors: Nam H. Nguyen, Anaheim, CA (US); Richard J. Thompson, Huntsville, AL (US); Marna M. Kagele, Seattle, WA (US)

(73) Assignee: The Boeing Company, Chicago, IL (US)

( * ) Notice: Subject to any disclaimer, the term of this patent is extended or adjusted under 35 U.S.C. 154(b) by 517 days.

(21) Appl. No.: 17/649,034

(22) Filed: Jan. 26, 2022

(65) Prior Publication Data

US 2023/0236873 A1    Jul. 27, 2023

(51) Int. Cl.
| | |
|---|---|
| G06F 9/46 | (2006.01) |
| G06F 9/48 | (2006.01) |
| G06N 10/20 | (2022.01) |
| G06N 10/80 | (2022.01) |
| G06F 9/50 | (2006.01) |

(52) U.S. Cl.
CPC .............. *G06F 9/48* (2013.01); *G06N 10/20* (2022.01); *G06N 10/80* (2022.01); *G06F 9/5011* (2013.01)

(58) Field of Classification Search
CPC ........ G06F 9/48; G06F 9/5011; G06F 9/5055; G06F 9/5061; G06F 9/5066
See application file for complete search history.

(56) References Cited

U.S. PATENT DOCUMENTS

| | | | |
|---|---|---|---|
| 11,436,519 B1* | 9/2022 | Dridi | G06N 20/00 |
| 2017/0255592 A1* | 9/2017 | Karimi | G06N 10/00 |
| 2020/0065439 A1 | 2/2020 | Babbush et al. | |
| 2020/0081721 A1 | 3/2020 | Wood et al. | |
| 2020/0175411 A1 | 6/2020 | King et al. | |
| 2022/0309374 A1* | 9/2022 | Gonciulea | G06F 9/5072 |
| 2023/0020389 A1* | 1/2023 | Davis | G06F 9/5038 |
| 2023/0222372 A1* | 7/2023 | Fong | G06F 30/27 |
| | | | 703/21 |

OTHER PUBLICATIONS

Phalak et al., Quantum PUF for Security and Trust in Quantum Computing, arXiv:2104.06244v3, 2021, 10 pages. (Year: 2021).*
Zhao et al., "Measurement reduction in variational quantum algorithms," Center for Quantum Information and Control, Department of Physics and Astronomy, Univ. of New Mexico, Jun. 23, 2020, 21 pages.
Hamamura et al., "Efficient evaluation of quantum observables using entangled measurements," NPJ Quantum Information, vol. 56, 2020, 8 pages.

* cited by examiner

*Primary Examiner* — Diem K Cao
(74) *Attorney, Agent, or Firm* — Yee & Associates, P.C.

(57) ABSTRACT

A method, apparatus, computer system, and computer program product for parallelizing quantum processes for processing a problem. A computer system identifies subproblems in the problem based on a structure of the problem. The computer system identifies quantum circuits in a set of quantum computers to process the subproblems. The computer system executes jobs on the quantum circuits to solve the subproblems.

20 Claims, 8 Drawing Sheets

QUANTUM PROCESS PARALLELIZATION

BACKGROUND INFORMATION

1. Field

The present disclosure relates generally to improved computer system and in particular, to parallel quantum processes running in a computer system.

2. Background

Quantum algorithms are processes that can be run on quantum computers to solve various problems. A quantum computer is a machine that uses the properties of quantum physics to store data and perform computations. Quantum computers can contain quantum gates that can be organized or connected to perform operations on qubits.

As the problems to be solved become larger, the resources needed can be too large or costly for current quantum computers. For example, the overall runtime of a problem may be much longer than desired or supported by a quantum computer.

Therefore, it would be desirable to have a method and apparatus that take into account at least some of the issues discussed above, as well as other possible issues. For example, it would be desirable to have a method and apparatus that overcome a technical problem insufficient quantum computer resources being available for solving problems using quantum algorithms.

SUMMARY

An embodiment of the present disclosure provides a method for parallelizing quantum processes for processing a problem. A computer system identifies subproblems in the problem based on a structure of the problem. The computer system identifies quantum circuits in a set of quantum computers to process the subproblems. The computer system executes jobs on the quantum circuits to solve the subproblems. According to other illustrative embodiments, a computer system and a computer program product for parallelizing quantum processes for processing are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that parallelization of quantum processing can be used to reduce quantum computing resources needed for solving problems using quantum capabilities. For example, the illustrative embodiments recognize and take into account that Variational Quantum Eigensolver (VQE) is a quantum process that can be applied to solve chemistry problems such as those involving electronic structures. The illustrative embodiments recognize and take into account that currently required quantum resources, such as the number of quantum circuits, needed for execution and measurement when applying Variational Quantum Eigensolver to electronic structure problems can be very large and too costly for currently available quantum computers to run.

The illustrative embodiments recognize and take into account that this quantum algorithm can be modified to allow for the entire process or workflow to be parallelized. Thus, illustrative embodiments provide a method, apparatus, system, and computer program product for parallelizing quantum processes for processing a problem. A computer system identifies subproblems in the problem based on a structure of the problem. The computer system identifies quantum circuits in a set of quantum computers to process the subproblems. The computer system executes jobs on the quantum circuits to solve the subproblems.

Figure 1:
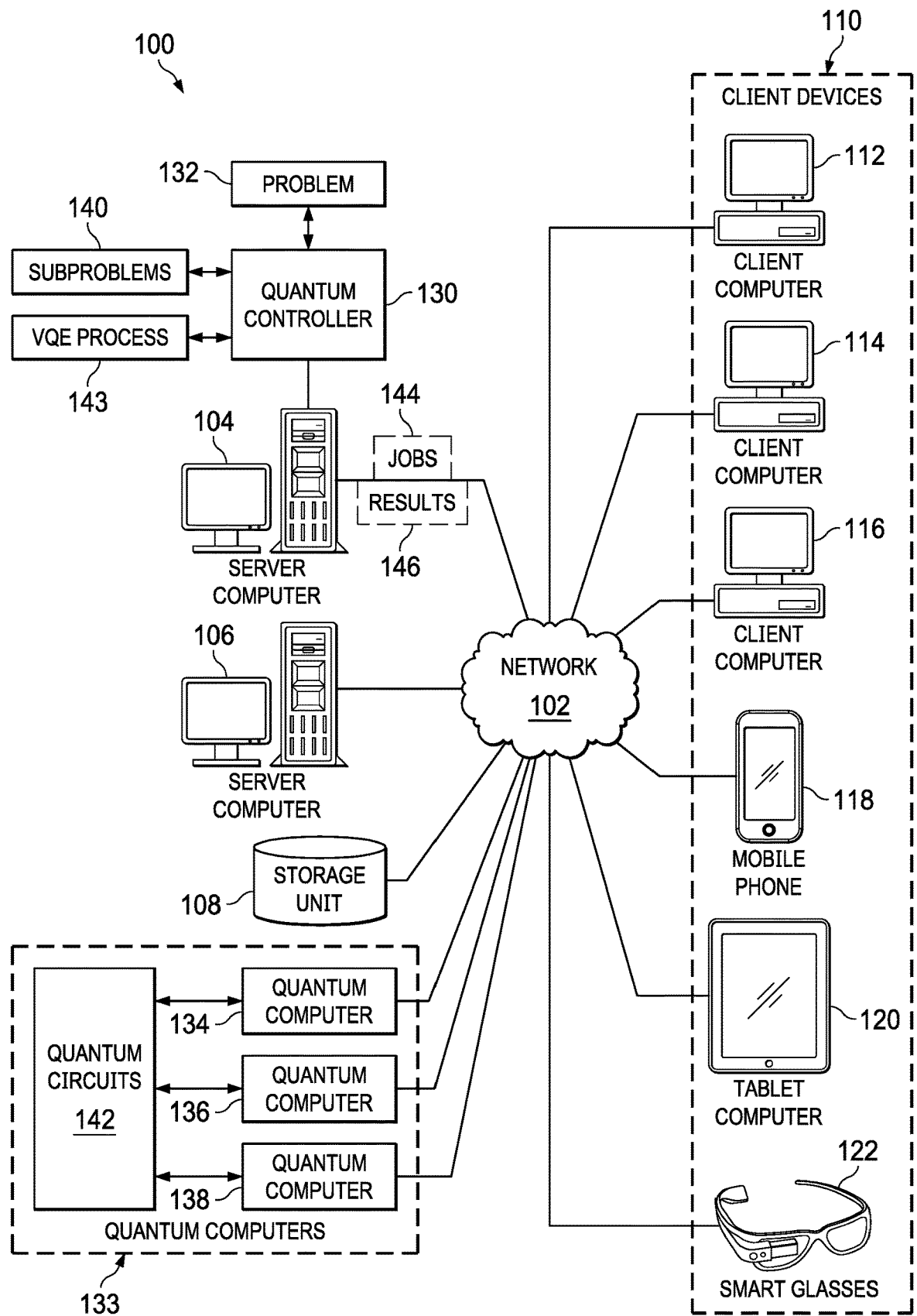
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, quantum controller 130 is located on server computer 104. Quantum controller 130 operates to solve problem 132 using quantum resources. These quantum resources include quantum computers 133, which comprises quantum computer 134, quantum computer 136, and quantum computer 138 in this depicted example. Quantum computers 133 are in communication with network 102. These quantum computers can be part of gate based quantum hardware platforms from the same or different service providers.

In this illustrative example, problem 132 is a problem that can be run on a quantum computer. Problem 132 can be a quantum problem that can be more efficiently solved using a quantum computer. In this illustrative example, quantum controller 130 subproblems 140 from problem 132. Subproblems 140 can be identified from problem 132 based on the structure of problem 132. This structure can be the calculations performed to solve problem 132. In this illustrative example, subproblems 140 are identified such that each subproblems is independent of another subproblem in subproblems 140. In other words, a subproblem in subproblems 140 does not depend on information or intermediate results from another subproblem in subproblems 140.

Quantum controller 130 then identifies quantum circuits 142 in one or more of quantum computer 134, quantum computer 136, and quantum computer 138 that can run to solve subproblems 140. For example, quantum controller 130 can send jobs 144 to control quantum computers 133 to solve subproblems 140.

In one illustrative example, each one of quantum computers 133 can run quantum processes to solve one of subproblems 140. In other illustrative examples, one of quantum computers 133 can run processes to solve two or more of subproblems 140. The particular quantum computer in quantum computers 133 selected for a subproblem in subproblems 140 depends on the characteristics of the subproblem. For example, a particular subproblem may require some number of qubits, precision level, or other attributes for solving the subproblem. The quantum computer selected from quantum computers 133 for the particular subproblem depends whether the quantum computer has resources that can handle the attributes for the subproblem.

In this illustrative example, subproblems 140 can be solved in parallel by quantum computers 133. For example, two circuits in quantum computer 134 can operate to solve two subproblems in subproblems 140 at the same time. As another example, quantum circuits 142 in quantum computer 134, quantum computer 136, and quantum computer 138 can each operate to solve one or more problems in subproblems 140 in parallel to each other. In response to solving the problems, quantum computers 133 return results 146 to quantum controller 130.

As a result, quantum controller 130 can operate to solve problem 132 through the identification subproblems 140. The subproblems can then be solved using quantum computers 133 in which these quantum computers can operate to solve subproblems in parallel. Further, by identifying subproblems, the individual subproblems can require less resources as compared to problem 132 as a whole. As a result, when none of quantum computers 133 may be able to operate to solve problem 132, quantum computers 133 can solve subproblems 140 identified from problem 132.

In this illustrative example, quantum controller 130 can run Variational Quantum Eigensolver (VQE) process 143 to generate jobs 144 to solve subproblems 140. For example, Variational Quantum Eigensolver (VQE) process 143 can be used to find the electronic ground state energy for a Hydrogen molecule at a specific geometric configuration. For example, if problem 132 involves examining lithium hydride (LiH) in the minimal basis set approximation at 2.0 Angstrom bond length using superconducting quantum computing system with a conventional configuration will take several hours. Through parallelization using quantum controller 130 to divide this problem into subproblems 140, solving problem 132 through solving subproblems 140 using parallel processing can reduce the time needed to solve problem 132 from several hours to minutes using a range of quantum computers of varying qubit sizes in quantum computers 133.

Figure 2:
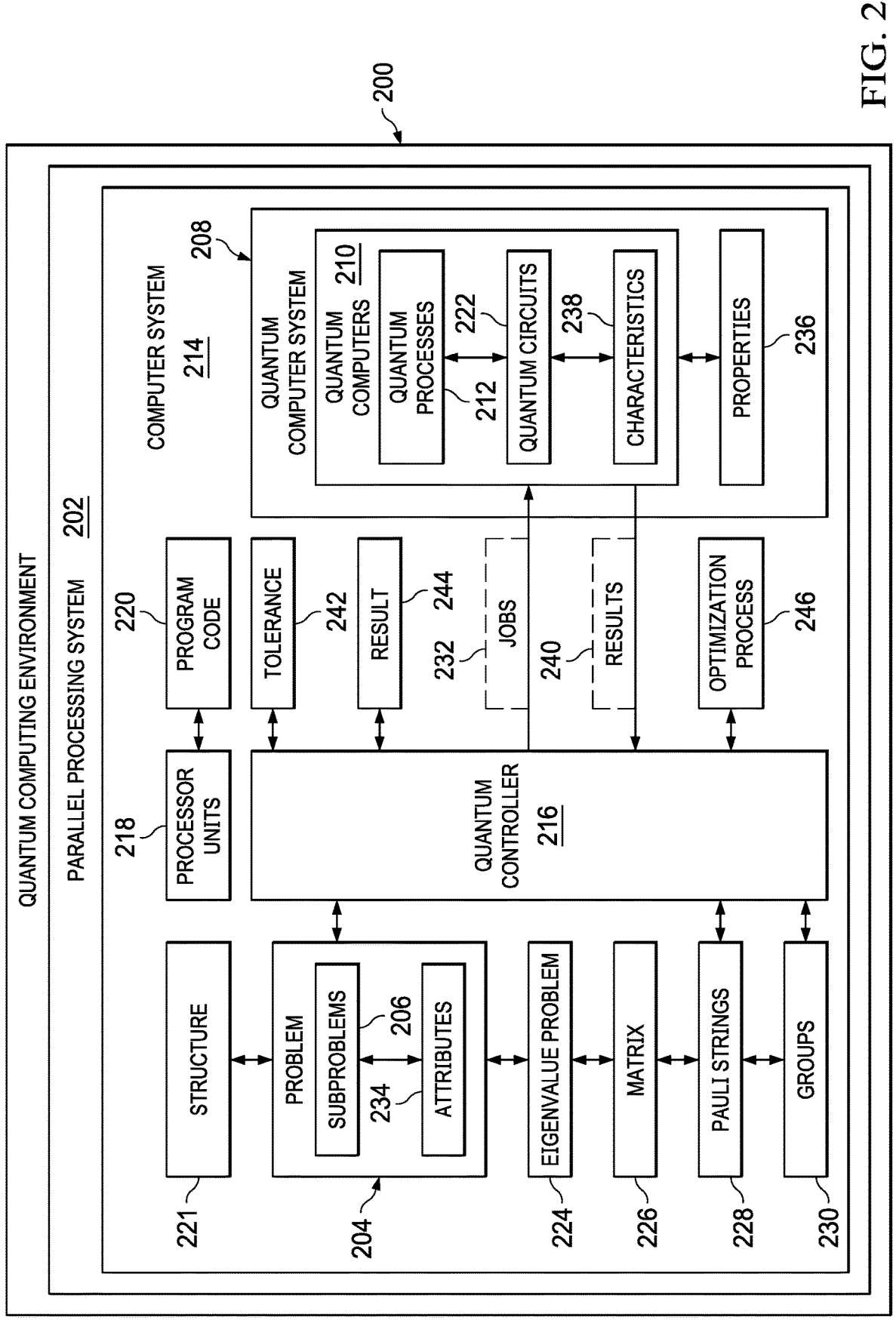
FIG. 2 is a block diagram of a quantum computing environment in accordance with an illustrative embodiment.

With reference now to FIG. 2, a block diagram of a quantum computing environment is depicted in accordance with an illustrative embodiment. In this illustrative example, quantum computing environment 200 includes components that can be implemented in hardware such as the hardware shown in network data processing system 100 in FIG. 1.

In this illustrative example, parallel processing system 202 in quantum computing environment 200 can process problem 204 in a quantum computer system 208 comprising a set of quantum computers 210. Problem 204 can be processed more quickly by dividing problem 204 into subproblems 206. As depicted, subproblems 206 can be processed in parallel using quantum processes 212 in a set of quantum computers 210 within quantum computer system 208.

As depicted, parallel processing system 202 comprises computer system 214 and quantum controller 216. Quantum controller 216 can be implemented in software, hardware, firmware or a combination thereof. When software is used, the operations performed by quantum controller 216 can be implemented in program code configured to run on hardware, such as a processor unit. When firmware is used, the operations performed by quantum controller 216 can be implemented in program code and data and stored in persistent memory to run on a processor unit. When hardware is employed, the hardware can include circuits that operate to perform the operations in quantum controller 216.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 214 is a physical hardware system and includes one or more data processing systems. When more than one data processing system is present in computer system 214, those data processing systems are in communication with each other using a communications medium. The communications medium can be a network. The data processing systems can be selected from at least one of a computer, a server computer, a tablet computer, or some other suitable data processing system.

As depicted, computer system 214 includes a number of processor units 218 that are capable of executing program code 220 implementing processes in the illustrative examples. As used herein a processor unit in the number of processor units 218 is a hardware device and is comprised of hardware circuits such as those on an integrated circuit that respond and process instructions and program code that operate a computer. When a number of processor units 218 execute program code 220 for a process, the number of processor units 218 is one or more processor units that can be on the same computer or on different computers. In other words, the process can be distributed between processor units on the same or different computers in a computer system. Further, the number of processor units 218 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

As depicted, quantum computer system 208 is depicted as part of computer system 214. In other words, computer system 214 can include classical data processing systems or computers in addition to a set of quantum computers 210 in quantum computer system 208.

In one illustrative example, quantum controller 216 parallelizes quantum processes 212 for processing problem 204 by performing a number of different operations.

Quantum controller 216 identifies subproblems 206 in problem 204 based on structure 221 of problem 204. In one illustrative example, this structure can be identified from calculations performed to solve problem 204.

In this illustrative example, subproblems 206 are independent of each other. A subproblem is independently solved from other subproblems. For example, the calculations performed in each subproblem can be independent of other calculations another subproblems.

For example, subproblems 206 can be run in parallel on quantum circuits 222 in one of quantum computers 210 and do not require results or intermediate results from other subproblems to complete running. In other words, dependencies between subproblems 206 are absent during run time. Subproblems 206 and quantum circuits 222 on which subproblems 206 run are independent of each other. As a result, in one illustrative example subproblems 206 can be submitted to the same quantum computer but sent to different parts of a quantum circuit in quantum circuits 222 that do not interact with each other. In other examples, subproblems 206 different quantum circuits in the same quantum computer in which the different quantum circuits do not interact with each other.

As a result, the subproblems 206 and quantum circuits 222 on which subproblems 206 run are independent of each other, and subproblems 206 can be submitted to run on different parts of a quantum circuit on the same quantum computer. Also, in the illustrative example, all of quantum circuits 222 finish running subproblems 206 for problem 204 before starting another iteration if another iteration is needed in solving problem 204.

In one illustrative example, problem 204 can be eigenvalue problem 224 for matrix 226. Matrix 226 can be solved for purposes such as a minimum, a maximum, multiple eigenvalues of matrix 226, finding eigenvectors of matrix 226, calculating a decomposition of matrix 226, diagonalization of matrix 226, finding singular decomposition values of matrix 226, inverting matrix 226 to determine a solution vector to a linear system of equations, or for other suitable purposes.

In considering the structure 221 of calculations performed to identify subproblems 206, Pauli strings 228 can be identified by quantum controller 216 for matrix 226. A Pauli string is a matrix constructed from Pauli matrices. For example, a Pauli string of length n is a matrix constructed from n-fold tensor product of Pauli matrices. In this illustrative example, Pauli matrices are set of four 2×2 complex matrices which are Hermitian and unitary, which are formed from three Pauli matrices and a 2×2 identity matrix. In the illustrative example, a Pauli string of length n is a matrix constructed from n-fold tensor product of Pauli matrices along with the 2×2 identity matrix. In this illustrative example, Pauli matrices and the 2×2 identity matrix are set of four 2×2 complex matrices which are Hermitian and unitary.

In the illustrative examples, the set of all Pauli strings of length n formed an orthogonal basis of the real vector space of $2^n \times 2^n$ Hermitian matrix and the complex vector space of all $2^n \times 2^n$ matrices. As a result, matrix 266 can be described using linear combination of Pauli strings 228.

Quantum controller 216 places Pauli strings 228 into groups 230 that form subproblems 206. In other words, each group of Pauli strings corresponds to a subproblem in subproblems 206. Pauli strings 228 in a group can be run on a same quantum circuit in quantum circuits 222.

Quantum controller 216 identifies quantum circuits 222 in a set of quantum computers 210 to process subproblems 206. In identifying quantum circuits 222, quantum controller 216 identifies attributes 234 of subproblems 206. In the illustrative examples, attributes 234 identify of what is needed to solve subproblem 206. Attributes 234 can be selected from at least one of a number of qubits, number of quantum circuits, a precision level; a depth of quantum circuits, a cross talk error, or some other attribute for subproblems 206. Different subproblems can have different attributes.

In one illustrative example, an attribute in attributes 234 can be the number of quantum circuits 222 needed for subproblems 206. This determination can be on the number of Pauli strings for subproblems 206.

As another example, a number of qubits needed in a quantum circuit in quantum circuits 222 for a subproblem in subproblems 206 can be determined based on the size of the Pauli string for the subproblem. Each group or family of Pauli strings can run on a quantum circuit. The length of a Paul string is used to determine the number of qubits needed for a quantum circuit for a particular subproblem. For example, Pauli string P1=XYYXY is a 32 by 32 matrix made up from 5-fold tensor of Pauli matrices, and 5 qubits are needed in the quantum circuit for that sub-problem.

Quantum controller 216 selects the set of quantum computers 210 having properties 236 to handle attributes 234 of subproblems 206. In this illustrative example, different quantum computers and quantum computers 210 can have different properties 236. In the illustrative example, properties 236 can be characteristics 238 of quantum circuits 222 in the set of quantum computers 210. As a result, particular quantum computers in the set of quantum computers 210 can be selected for particular subproblems in subproblems 206 by comparing attributes 234 of subproblems 206 to characteristics 238 of quantum circuits 222 that form properties 236 for the set of quantum computers 210.

For example, a property for the set of quantum computers 210 can be the number of qubits available. If a subproblem has an attribute requiring 50 qubits, then a quantum computer in quantum computers 210 having 50 qubits available for quantum circuit can be selected for subproblem. Quantum computers 210 that do not have at least 50 qubits for a quantum circuit are not considered for use in solving the subproblem.

As another example, another attribute for a subproblem can be the depth needed in a quantum circuit for the subproblem. In the illustrative example, the depth is the depth of a quantum circuit. A quantum circuit is made up by sequence of gates and depth of the quantum circuit is the associated length of this sequence of gates. Quantum computers having the capability to execute the depth using quantum circuits 222 can be considered for use in solving the particular subproblem. The depth can be limited based on the particular quantum computer or amount of time that qubits can hold a quantum property. In this example, the depth of the circuit can be set by the quality of the quantum computer. As the quality of the quantum computer increases, the circuit depth that can be used increase. As the depth of the quantum circuits increases, the amount time needed to hold quantum properties in qubits and quantum circuit also increases.

Further, in selecting the set of quantum computers 210 having quantum circuits 222 to handle the attributes 234 of subproblems 206, more than one subproblem can be solved on the same quantum computer.

Quantum controller 216 executes jobs 232 on the quantum circuits to solve subproblems 206. In this illustrative example, quantum controller 216 sends jobs 232 to the set of quantum computers 210. The jobs can include, for example, subproblems 206, a configuration for quantum circuits 222, and other information needed by a quantum computer run the job to solve the subproblem.

Quantum controller 216 receives results 240 from set of quantum computers having quantum circuits 222 configured to run jobs 232 to solve subproblems 206. Results 240 can be measurement results identified from measuring quantum circuits 222 running jobs 232 subproblems 206.

Quantum controller 216 can repeat executing jobs 232 on quantum circuits 222 to solve subproblems 206 in response result 244 being outside of tolerance 242. Result 244 is a result for problem 204 and can be determined from results 240 returned in response to jobs 232 being run on quantum circuits 222 to solve subproblems 206. For example, result 244 converges but the convergence may be outside of tolerance 242. In another illustrative example, result 244 maybe outside of a tolerance for an expected result.

In one illustrative example, result 244 may not converge at a desired rate. This desired rate is the tolerance. When the rate the convergence within the desired rate, the iterative optimization process to optimize result 244 ends.

In determining whether result 244 is within tolerance 242, quantum controller 216 can send result 244 from executing jobs 232 to optimization process 246. Examples of optimization algorithm that can be used for optimization process 246 include Gradient Descent, Simultaneous Perturbation Stochastic Approximation sequential least-squares quadratic programming, Nelder-Mead, and constrained optimization by linear approximation. Optimization algorithms that can be used for optimization process 246 also can include stochastic algorithms or other heuristic and metaheuristic approaches.

In one illustrative example, one or more technical solutions are present that overcome a technical problem with running jobs for solving problems on quantum computers having limited resources as compared to the resources needed to run the jobs. Computer system 214 can be configured to perform at least one of the steps, operations, or actions described in the different illustrative examples using software, hardware, firmware or a combination thereof. As a result, computer system 214 operates as a special purpose computer system in which quantum controller 216 in computer system 214 enables processing problems using quantum circuits more efficiently as compared to currently used techniques. In the illustrative example, quantum controller 216 transforms computer system 214 into a special purpose computer system as compared to currently available general computer systems that do not have quantum controller 216 to control the running of jobs using quantum circuits in a set of quantum computers to solve problem.

In the illustrative example, the use of quantum controller 216 in computer system 214 integrates processes to solve a problem through dividing problem subproblems and selecting resources in quantum computers that are suitable for solving each of the subproblems. In one illustrative example, a method provides quantum processes to solve a problem in manner that increases the performance of computer system 214.

In other words, quantum controller 216 in computer system 214 is directed to a practical application of processes integrated into quantum controller 216 in computer system 214 that enables breaking up a problem into subproblems and identifying resources in one or more quantum computers to run quantum processes to solve subproblems. As result, constraints caused by the resources needed to run a problem is reduced through identifying subproblems and when quantum processes to solve subproblems in quantum circuits in one or more quantum computers in computer system 214.

The illustration of quantum computing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, quantum computer system 208 can be a separate system from computer system 214. In other words, computer system 214 can contain classical types of data processing systems without including quantum computers 210. As another example, quantum controller 216 can process additional problems in addition to problem 204 in a parallel manner using quantum computer system 208.

Figure 3:
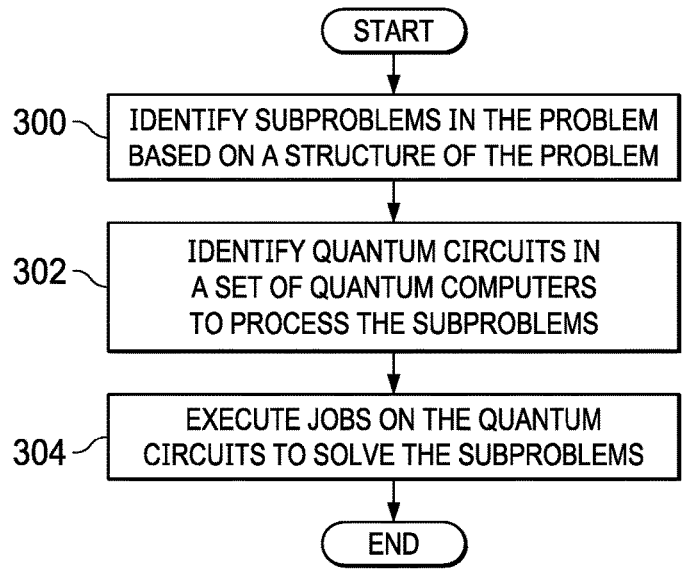
FIG. 3 is an illustration of a flowchart of a process for parallelizing quantum processes for processing a problem in accordance with an illustrative embodiment.

Turning next to FIG. 3, an illustration of a flowchart of a process for parallelizing quantum processes for processing a problem is depicted in accordance with an illustrative embodiment. The process in FIG. 3 can be implemented in hardware, software, or both. When implemented in software, the process can take the form of program code that is run by one of more processor units located in one or more hardware devices in one or more computer systems. For example, the process can be implemented in quantum controller 216 in computer system 214 in FIG. 2.

The process begins by identifying subproblems in the problem based on a structure of the problem (operation 300). The process identifies quantum circuits in a set of quantum computers to process the subproblems (operation 302).

The process executes jobs on the quantum circuits to solve the subproblems (operation 304). The process terminates thereafter.

Figure 4:
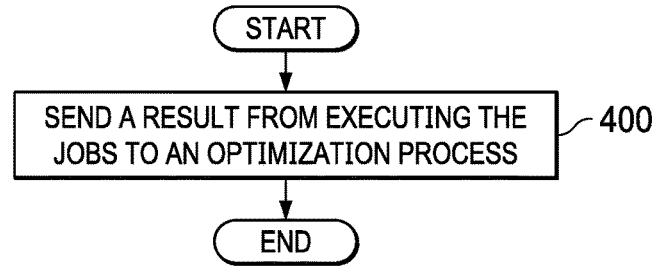
FIG. 4 is an illustration of a flowchart of a process for parallelizing quantum processes for processing a problem in accordance with an illustrative embodiment.

Turning to FIG. 4, an illustration of a flowchart of a process for parallelizing quantum processes for processing a problem is depicted in accordance with an illustrative embodiment. The process illustrated in this figure is an example of an additional operation that can be performed with the operations in the flowchart in FIG. 3.

The process sends a result from executing the jobs to an optimization process (operation 400). The process terminates thereafter.

Figure 5:
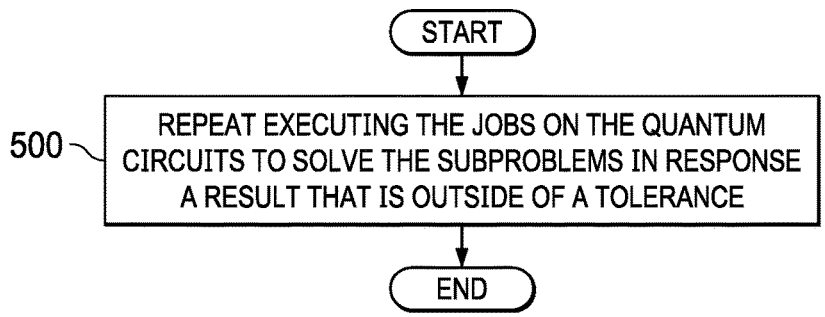
FIG. 5 is an illustration of a flowchart of a process for parallelizing quantum processes for processing a problem in accordance with an illustrative embodiment.

With reference now to FIG. 5, an illustration of a flowchart of a process for parallelizing quantum processes for processing a problem is depicted in accordance with an illustrative embodiment. The process illustrated in FIG. 5 is an example of an additional operation that can be performed with the operations in the flowchart in FIG. 3.

The process repeats executing the jobs on the quantum circuits to solve the subproblems in response a result that is outside of a tolerance (operation 500). The process terminates thereafter.

Figure 6:
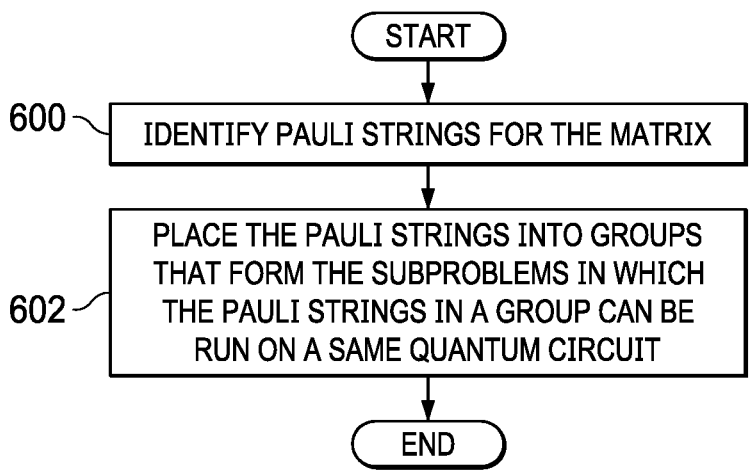
FIG. 6 is an illustration of a flowchart of a process identifying subproblems quantum processes in accordance with an illustrative embodiment.

In FIG. 6, an illustration of a flowchart of a process identifying subproblems quantum processes is depicted in accordance with an illustrative embodiment. The process illustrated in this figure is an example of an implementation for operation 300 in FIG. 3. In this depicted example, the problem is solving an eigenvalue problem for a matrix.

The process identifies Pauli strings for the matrix (operation 600). In operation 600, the Pauli strings are a representation of a structure of the problem. The process places the Pauli strings into groups that form the subproblems in which the Pauli strings in a group can be run on a same quantum circuit (operation 602). The process terminates thereafter.

Figure 7:
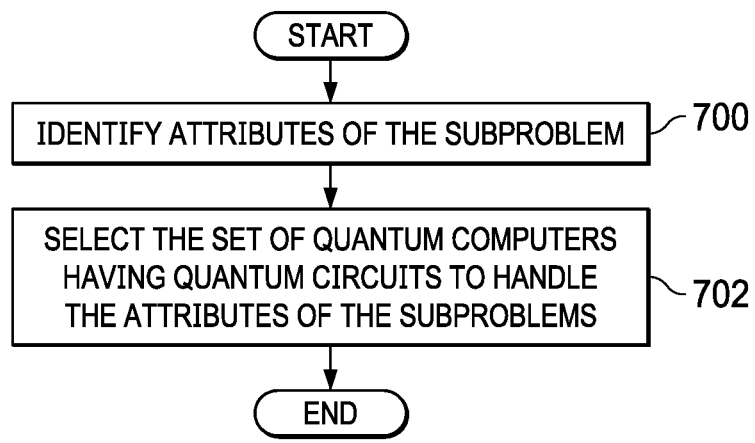
FIG. 7 is an illustration of a flowchart of a process identifying quantum circuits to process the subproblems in accordance with an illustrative embodiment.

With reference now to FIG. 7, an illustration of a flowchart of a process identifying quantum circuits to process the subproblems is depicted in accordance with an illustrative embodiment. The process illustrated in this figure is an example of an implementation for operation 302 in FIG. 3.

The process identifies attributes of the subproblem (operation 700). The process selects the set of quantum computers having quantum circuits to handle the attributes of the subproblems (operation 702). The process terminates thereafter.

Figure 8:
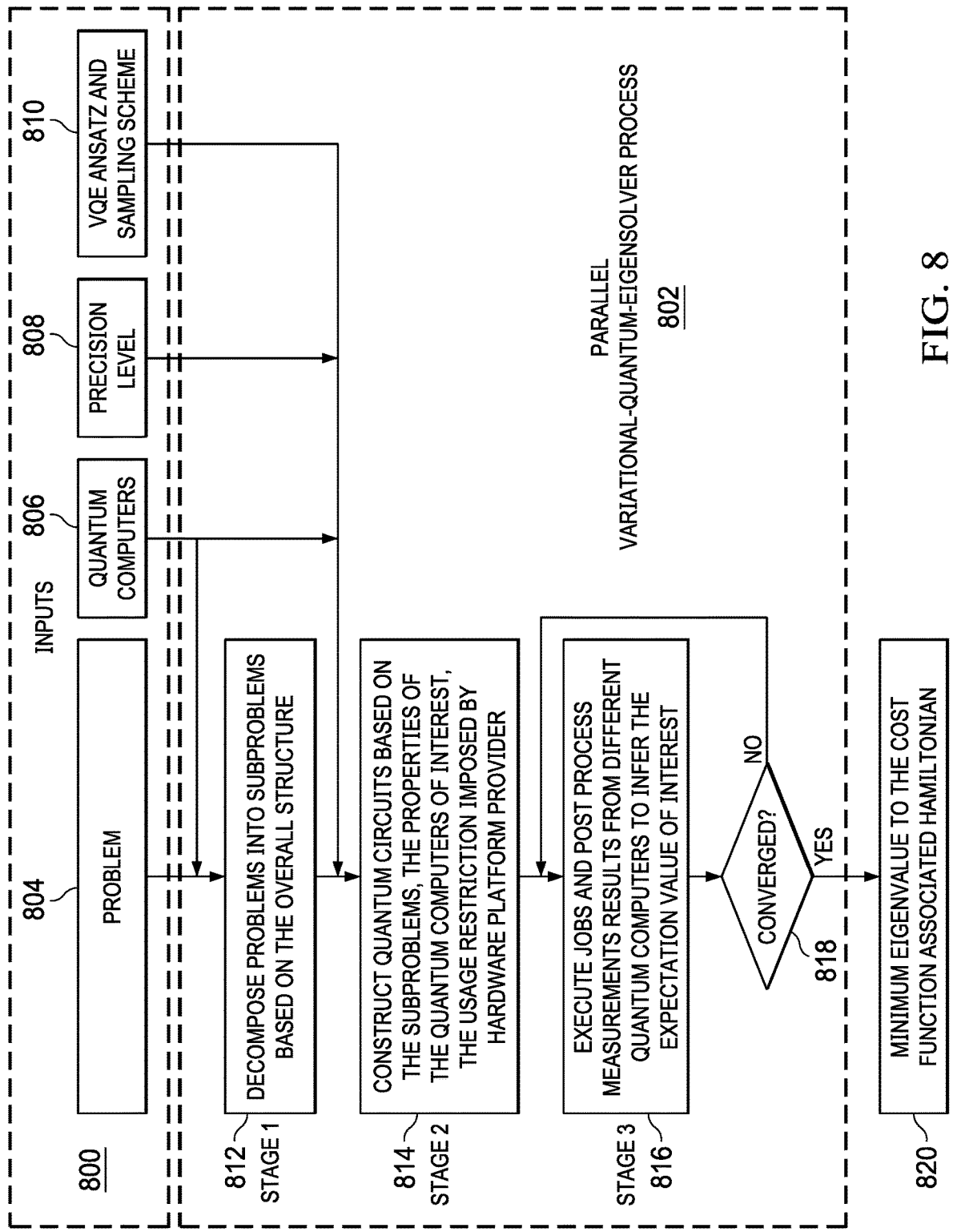
FIG. 8 is an illustration of a process for parallelizing quantum processes processing problems in accordance with an illustrative embodiment.

Turning next to FIG. 8, an illustration of a process for parallelizing quantum processes processing problems is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in quantum controller 216 in computer system 214 in FIG. 2 to solve problem 204 using running quantum processes 212 using quantum circuits 222 in a set of quantum computers 210.

In this illustrative example, inputs 800 are provided to parallel Variational-Quantum-Eigensolver (VQE) process 802 for the different stages of this process. As depicted, inputs 800 comprise problem 804, quantum computers 806, precision level 808, VQE ansatz and sampling scheme 810

Problem 804 can be an eigenvalue problem for a matrix. Quantum computers 806 is an identification of quantum computers that are available for use. In VQE ansatz and sampling scheme 810, VQE ansatz is a starting quantum circuit and the sampling scheme is a scheme selected for collecting measurements and obtaining statistics.

In the first stage, parallel Variational-Quantum-Eigensolver (VQE) process 802 decomposes decompose the problem into subproblems based on the overall structure of the problem (operation 812).

In the second stage, parallel Variational-Quantum-Eigensolver (VQE) process 802 constructs quantum circuits based on the subproblems, the properties of the quantum computers of interest, the usage restriction imposed by hardware platform provider (operation 814).

In operation 814, the quantum circuits can be configured based on the resources in quantum computers 806 identified in inputs 800. Some quantum computers maybes more suitable for running jobs for some subproblems and other quantum computers based on the properties of those quantum computers. These quantum circuits can be constructed based on the resources needed to run jobs to solve the subproblems identified in operation 812.

The quantum circuits can be configured based on VQE Ansatz and sampling scheme 810 identified in inputs 800. VQE Ansatz is a parameterized quantum circuit. In other words, this quantum circuit is the base circuit for a quantum circuit with a fixed structure. For example, the VQE Ansatz is the base circuit for entire quantum circuit for a subproblem. Each subproblem starts with the VQE Ansatz input in VQE Ansatz and sampling scheme 810 and can have follow-up gates that are selected based on the particular Pauli string. In other words, additional gates can be added to the VQE Ansatz for particular subproblems for particular Pauli strings.

In being fixed, gates are not added or removed during the running of a job using the quantum circuit. However, parameters for the gates can change during the running of the job.

Within this structure, a set of quantum gates in the VQE Ansatz have parameters that can be changed. The VQE Ansatz parameters for one or more gates can be set to change the operation of this quantum circuit.

Precision level 808 in inputs 800 identifies the precision of the output that results from processing the different subproblems to solve the problem. With the quantum circuits, the number of repetitions or measurements performed on the quantum circuits have a direct correspondence to the precision of result for the problem. For example, with a quantum circuit running a within a quantum process, running the quantum circuit 1000 times does not provide as much precision as with running the quantum circuit 2 million times. Depending on precision level 808, the quantum circuit can be configured to some number of times to obtain the desired level precision in precision level 808. Further, this quantum circuit can be duplicated in the quantum circuits to reduce the number of repetitions. In the illustrative example, the quantum circuit can be duplicated to overcome the provider threshold on the number of measurements. For example, some providers have a limit on how many measurements or repetitions a quantum circuit can be run in a single job submission. As a result, to obtain more measurements than allowed by a particular provider, quantum circuit is duplicated.

The sampling scheme in VQE Ansatz and sampling scheme 810 identifies how sampling of the quantum circuits is to be performed. Other factors in constructing quantum circuits include properties of the quantum computers. For example, the depth of quantum circuits, the amount of time that a qubit holds a property, or other factors can be used in constructing quantum circuits in selecting particular quantum computers for the quantum circuits.

In stage 3 816, parallel Variational-Quantum-Eigensolver (VQE) process 802 executes jobs on the quantum circuits in the quantum computers and post processes measurements results from different quantum computers to infer the expectation value of interest (operation 816). In operation 816, parallel Variational-Quantum-Eigensolver (VQE) process 802 takes the results of measurements of quantum circuits used in running jobs for the different subproblems and determines a result for the problem from these results generated from solving subproblems.

A determination is made as to whether the result for the problem has converged (operation 818). In this example, the determination can be made using a classical or currently available optimizer algorithm. If the problem has converged, the process outputs a minimum eigenvalue to the cost function associated Hamiltonian 820. Otherwise, the process returns to operation 816 to execute jobs in the quantum circuits and post process new measurements of the quantum circuits.

Figure 9:
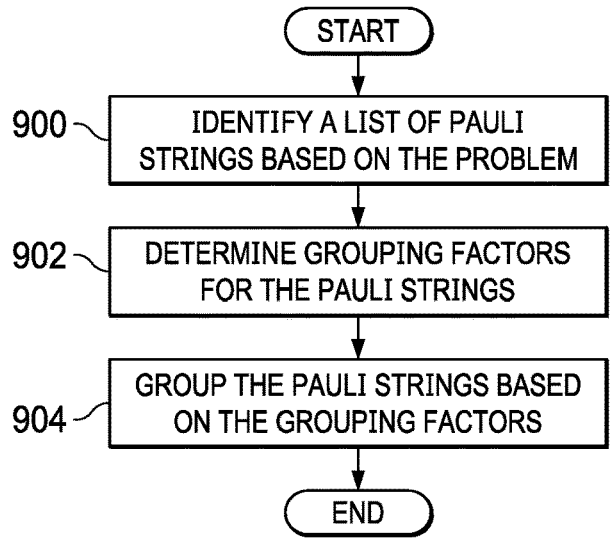
FIG. 9 is an illustration of a flowchart of a process for decomposing a problem into subproblems in accordance with an illustrative embodiment.

With reference now to FIG. 9, an illustration of a flowchart of a process for decomposing a problem into subproblems is depicted in accordance with an illustrative embodiment. This flowchart is an example of one implementation for operation 812 in FIG. 8. This process can be used to identify subproblems from a problem for parallelizing quantum processes.

The process begins by identifying a list of Pauli strings based on the problem (operation 900). The Pauli strings are based on the associated Hamiltonian matrix. The number of Pauli strings can be the initial number of quantum circuits needed to solve subproblems. For example, if 100 Pauli strings are present, 100 quantum circuits may be needed.

In this illustrative example, the Pauli strings can be grouped to reduce the number of quantum circuits needed. The process determines grouping factors for the Pauli strings (operation 902). In operation 902, the grouping factors can be based on various factors such as, for example, quality, subproblems needing greater precision, a number of groups, and other subproblems, and other suitable factors. These factors to be used as part of placing Pauli strings into groups.

The process groups the Pauli strings based on the grouping factors (operation 904). The process terminates thereafter.

Each of these groupings of Pauli strings is a subproblem. The Pauli strings in a group can be run on the same quantum circuit. Thus, if 25 groups of Pauli strings are generated, then 25 quantum circuits are used to solve subproblems instead of 100 quantum circuits.

Figure 10:
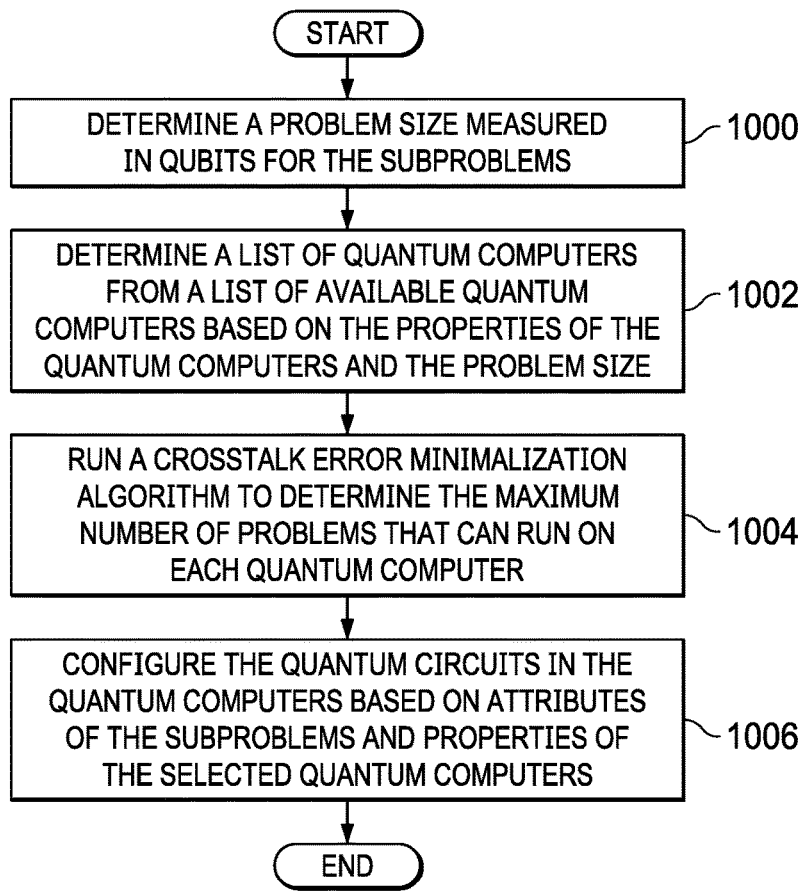
FIG. 10 is an illustration of a flowchart of a process constructing quantum circuits in accordance with an illustrative embodiment.

In FIG. 10, an illustration of a flowchart of a process constructing quantum circuits is depicted in accordance with an illustrative embodiment. This flowchart is an example of one implementation for operation 814 in FIG. 8.

The process begins by determining a problem size measured in qubits for the subproblems (operation 1000). The process determines a list of quantum computers from a list of available quantum computers based on the properties of the quantum computers and the problem size (operation 1002). In operation 1002, the list of quantum computers can be selected from available quantum computers based on the capacity of the quantum computers. For example, capacity can be based on the number of qubits available for use in each of the quantum computers on the list of available quantum computers. The process runs a crosstalk error minimalization algorithm to determine the maximum number of problems that can run on each quantum computer (operation 1004). Operation 1004 takes into account that the number of qubits support N quantum circuits running N subproblems. However, the crosstalk based on the proximity of qubits being used in a quantum computer may reduce the actual number of qubits available, reducing the number of quantum circuits that can be run on a quantum computer. As a result, unused qubits may be located between qubits used for circuits to run jobs for a subproblem to reduce crosstalk that may occur between qubits to a desired level.

The process configures the quantum circuits in the quantum computers based on attributes of the subproblems and properties of the selected quantum computers (operation 1006). The process terminates thereafter. Operation 1006 can also take into account user input identifying attributes for subproblems such as a precision level, number of groupings desired, and other factors. Operation 1006 can also take into account provided restrictions. For example, a provider may provide a limit on how many measurements can be run in an experiment, or other limitations.

Figure 11:
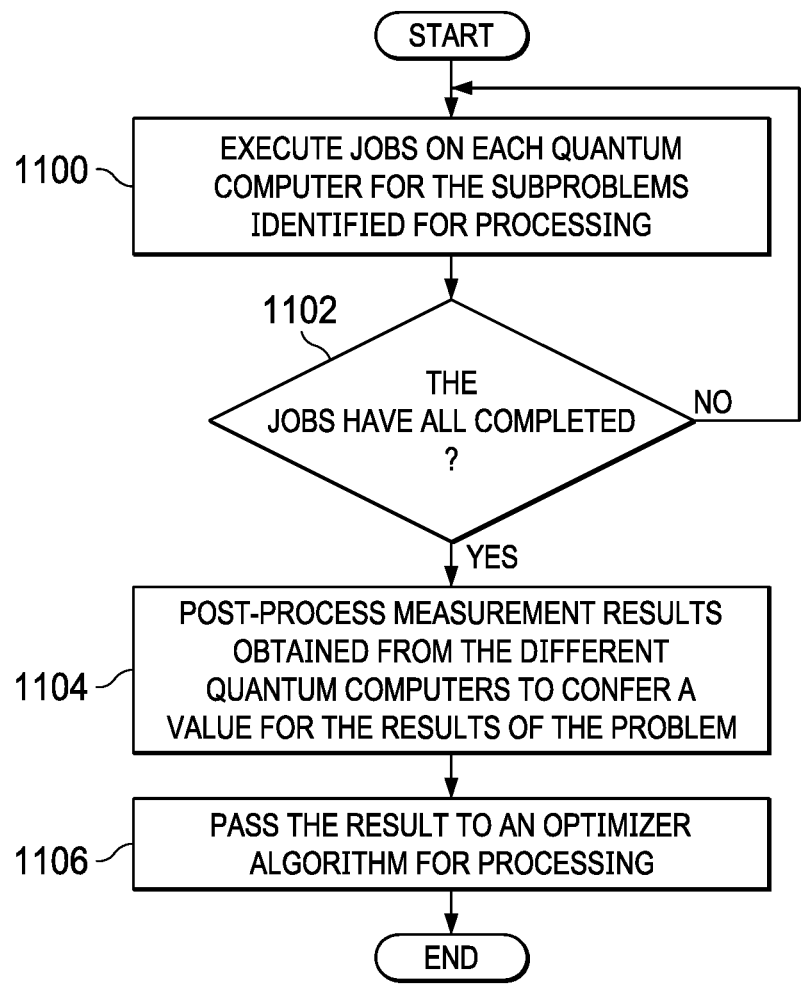
FIG. 11 is an illustration of a flowchart of a process for executing jobs postprocessing results with an illustrative embodiment.

Turning to FIG. 11, an illustration of a flowchart of a process for executing jobs postprocessing results is depicted with an illustrative embodiment. This flowchart is an example of one implementation for operation 816 in FIG. 8.

The process begins by executing jobs on each quantum computer for the subproblems identified for processing (operation 1100). The process determines whether the jobs have all completed (operation 1102).

If all the jobs have not been completed, the process returns to operation 1100. Otherwise, the process post processes measurement results obtained from the different quantum computers to confer a value for the results of the problem (operation 1104). The process then passes the result to an optimizer algorithm for processing (operation 1106). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
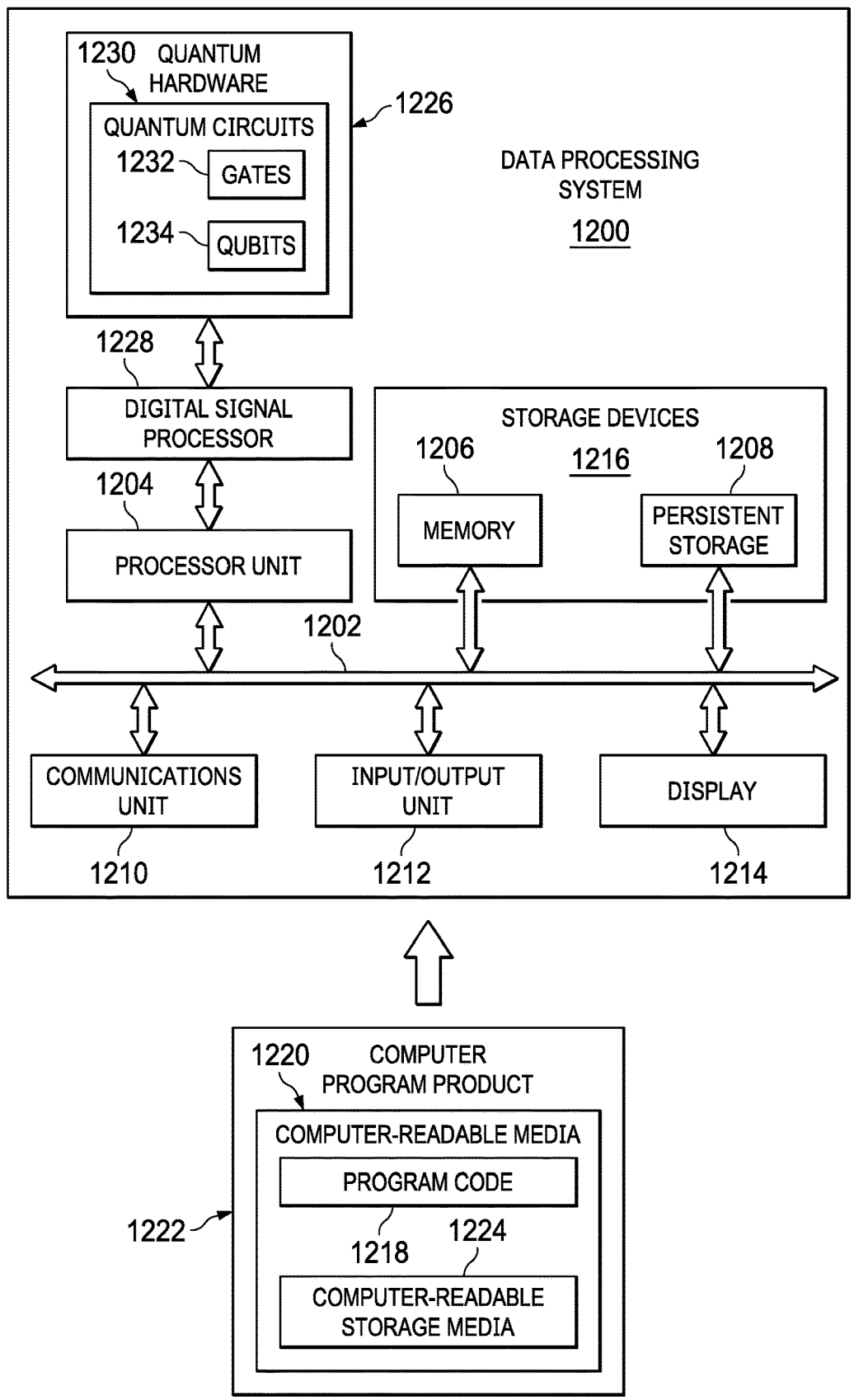
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 can be used to implement server computer 104, server computer 106, client devices 110, quantum computer 134, quantum computer 136, and quantum computer 138 in FIG. 1. Data processing system 1200 can also be used to implement computer system 214. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 can take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 can provide a connection for user input through at least one of a keyboard, a mouse, or some other suitable input device. Further, input/output unit 1212 can send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which can be located in a memory, such as memory 1206.

These instructions are program instructions and are also referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

Computer-readable storage media 1224 is a physical or tangible storage device used to store program code 1218 rather than a media that propagates or transmits program code 1218. Computer readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 can be transferred to data processing system 1200 using a computer-readable signal media. The computer-readable signal media are signals and can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, can be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

In this illustrative example, quantum hardware 1226 is an optional component and when quantum hardware 1226 is present, data processing system 1200 can be considered a quantum computer. As depicted, processor unit 1204 can operate to control quantum hardware 1226 to implement quantum processes or algorithms.

For example, in executing instructions loaded into memory 1206, processor unit 1204 can exchange information with digital processor (DSP) 1228, which in turn exchanges analog signals with quantum hardware 1226. In this illustrative example, the information sent to quantum hardware 1226 can include instructions, data, or other types of information that can be used by quantum hardware 1226 to execute quantum processes or algorithms. The information received from quantum hardware 1226 can also take the form of results, data, instructions, or other information generated by quantum hardware 1226.

Quantum hardware 1226 can comprise quantum circuits 1230 that are formed from gates 1232 and qubits 1234. Gates 1232 are quantum gates and are also referred to as quantum logic gates. Quantum gates 1232 can be taken number of different forms. For example, quantum gates 1232 and be selected from at least one of a Hadamard gate, a phase shifter gate, a controlled gate, or some other suitable type of quantum gate.

In the illustrative example, qubits 1234 are also referred to as quantum bits. Qubits can be in a 1 or 0 state, or in a superposition of the 1 and 0 states. However, when measured, the qubit is always 1 or 0 depending on the quantum state of the qubit immediately prior to measurement.

Example

In one illustrative example, a quantum process in the form of a Variational Quantum Eigensolver (VQE) algorithm can be implemented to solve a problem in the form of a quantum chemistry problem, such as finding an electronic ground state energy of the molecule.

A fundamental equation in quantum chemistry is the non-relativistic, time-independent Schrodinger equation:

$$H(r)\psi(r)=E\psi(r) \qquad (1)$$

where H is the molecular Hamiltonian, $\psi(r)$ is the multi-particle wave function of the system, and E is the energy eigenvalue. Equation (1) allows understanding the behavior of an isolated, non-relativistic system. Finding a solution is difficult except for a simplest case such as an instance $H_2^+$. The illustrative example can be implemented in quantum controller 216 in quantum computing environment 200 to find approximate solutions to this equation.

The molecular Hamiltonian, H in the first quantization, is as follows:

$$H = -\sum_i \frac{\nabla_{R_i}^2}{2M_i} - \sum_i \frac{\nabla_{r_i}^2}{2} - \sum_{i,j} \frac{Z_i}{|R_i - r_j|} + \sum_{i,j>i} \frac{Z_i Z_j}{|R_i - R_j|} + \sum_{i,j>1} \frac{1}{|r_i - r_j|} \qquad (2)$$

where $R_i$, $M_i$, and $Z_i$ represent the spatial coordinates, masses, charges of the nuclei in the molecule, respectively; and $r_i$ represents the electronic coordinates. In in equation (2), the two first terms represent the kinetic energy of the nuclei and electrons, respectively, while the third term, fourth, and fifth terms represent the Coulomb interactions between nuclei and electrons.

The calculation scales exponentially with system size on a classical computer because of dimensionality. However, on a quantum computer, the calculation scales polynomially. In this example, the units are "atomic" units, where the unit of length is $a_0$=1 Bohr=0.529×10$^{-10}$ m, the unit of mass is the electron mass ($m_e$), and the unit of energy is Hartree $$\left(1HA = \frac{e^2}{4\pi\epsilon_0 a_0} = 27.211\,eV\right).$$

The mass the nucleus is three orders of a magnitude greater than that of an electron, hence the nucleus moves much more slowly. Thus, a common simplifying assumption made in quantum chemistry calculations known as the Born-Oppenheimer (BO) approximation, treats the nuclei as stationary point charges.

Within this approximation, the kinetic energy term of the nuclei, $$\sum_i \frac{\nabla_{R_i}^2}{2M_i},$$

can be neglected; the repulsion between the nuclei, $$\sum_{i,j>i} \frac{Z_i Z_j}{|R_i - R_j|}$$

can be considered as a constant. Since any constant added to an operator only adds to the operator eigenvalues and has no effect on the operator eigenfunctions. As are result, this constant term can be added into the eigenvalue found from the BO-approximation.

The remaining terms from the BO-approximation are called the electronic Hamiltonian, $$H_{elec} = \sum_i \frac{\nabla_{R_i}^2}{2M_i} - \sum_{i,j} \frac{Z_i}{|R_i - r_j|} + \sum_{i,j>1} \frac{1}{|r_i - r_j|} \quad (3)$$

The electronic Schrodinger equation is then describe as $$H_{elec}\Phi_{elec} = E_{elec}\Phi_{elec} \quad (4)$$

where $\Phi_{elec}$ is the electronic wavefunction. The total energy for a fixed nuclei must also include the constant nuclear repulsion term. That is, $$E_{total} = E_{elec} + \sum_{i,j>i} \frac{Z_i Z_j}{|R_i - R_j|} \quad (5)$$

The total energy, $E_{total}$ in equation (5) provides a potential for nuclear motion, it creates a potential energy surface as the function of the nuclear motion.

The electronic Hamiltonian in equation (3) can be translated into the second-quantization representation using fermionic creation ($a^\dagger$) and annihilation (a) operators, respectively. These operators obey fermionic anti-commutation relations, which enforce the anti-symmetry of the wavefunction, a consequence of the Pauli Exclusion Principle. The electronic Hamiltonian can be written in the second quantization formulation as $$H = \sum_{pq} h_{qp} a_p^\dagger a_q + \frac{1}{2}\sum_{pqrs} h_{pqrs} a_p^\dagger a_q^\dagger a_r a_s \quad (6)$$

where a and $a^\dagger$ represent the creation and annihilation operators, they act on a basis of orthogonal spin orbitals, $\{\phi_i\}$, and obey the fermionic anti-commutation relations. The second sum in equation (6) above indicates that the terms in the fermionic form of the Hamiltonian scales as $\Theta(N^4)$. The terms $h_{pq}$ and $h_{pqrs}$ in equation (6) are one electron and two electron integrals.

$$h_{pq} = \int \phi_p^*(x_1)\left(-\frac{1}{2}\nabla^2 - \sum_i \frac{Z_i}{|R_i - r_i|}\right)\phi_q(x_1)dx_1 \quad (7)$$

$$h_{pqrs} = \int\int \frac{\phi_p^*(x_1)\phi_q(x_2)\phi_r(x_1)\phi_s(x_2)}{|r_1 - r_2|} dx_1 dx_2 \quad (8)$$

This Hamiltonian can then be translated to qubit form by the Jordan-Wigner, Parity, or Bravyi-Kitaev encoding scheme. With Jordan-Wigner of Parity mapping, the resulting qubit form will also have $O(N^4)$ terms, where each term is now a Pauli strings $P_i$. We refer to an n-qubit operator of the form $P_i \in \{I,X,Y,Z\}^{\otimes n}$ as a Pauli string. Therefore, we can rewrite our Hamiltonian as $$H = \Sigma_i^{O(N^4)} \alpha_i P_i = \Sigma_i^{O(N^4)} \alpha_i \Pi_j^n \sigma_j^i \quad (9)$$

Since each $P_i$ is unitary and Hermitian, it can be realized as both observable and a quantum gate. This provides a way to measure each of these terms, $P_i$ on a quantum computer directly through the simple Hadamard test or rotation of basis, and combined together to obtain the expectation value of $\langle H \rangle$. That is, $$\langle H \rangle = \Sigma_i^{O(N^4)} \alpha_i \langle P_i \rangle \quad (10)$$

The formula above in equation 10 indicates a need to execute $O(N^4)$ different rotational circuits to calculate the expectation of H. Thus, a large overhead cost is present. Since H is Hermitian, H has an orthonormal basis, says $\{|\Phi_i\rangle\}$ with corresponding set of real eigenvalues $\{E_i\}$, Then for any state $|\psi\rangle$, the following observation can be made:

$$\langle \psi|H|\psi\rangle = \Sigma \langle c_i \phi_i|H|c_i\phi_i\rangle = \Sigma|c_i|^2 \langle \phi_i|H|\phi_i\rangle$$
$$= \Sigma|c_i|^2 |E_i|^2 \geq E_0 \quad (11)$$

where $E_0$ is the smallest eigenvalue of H. $E_0$ is also known as the electronic ground state energy. Combine this and the fact that $\langle H \rangle$ can be measured on a quantum computer, a technique is present to solve the electronic structure problem on quantum computer The expectation for $O(N^4)$ number of terms is present and the overall running time can be larger than desired. This runtime can be reduced by grouping commuting terms into commuting group.

One manner in which this reduction can be made is to execute VQE using in parallelization through multiple quantum computers. This type of processing is possible since each evaluation of $\langle P_i \rangle$ is independent from one another. Thus, the calculation of each group of Pauli strings can be performed simultaneously.

For example, with a lithium hydride molecule at 1.5 Angstrom, the electronic Hamiltonian of the lithium hydride molecule can be described by a Hamiltonian consisting of 100 Pauli strings under the Gaussian minimal basis set STO-nG using Parity mapping. By grouping commutative terms, these 100 Pauli strings can be placed in into 25 groups. That is, $$H = \Sigma_{i=1}^{100} \alpha_i P_i = \Sigma_{i=1}^{25} H_i \quad (12)$$

Assume 5 quantum computers are present that have enough qubits and high enough quality to solve this particular problem. In assigning subproblems to quantum computers, the process places the sub-problem with minimal significance to the quantum computer with minimum quality, and the sub-problem that required high precision solution to the highest quality computer available. With this assumption, the problem can be split into subproblems run across all 5 quantum computers:

$$H = \overbrace{\sum_{k=1}^{5} H_i}^{QPU1} + \overbrace{\sum_{k=6}^{10} H_i}^{QPU2} + \overbrace{\sum_{k=11}^{15} H_i}^{QPU3} + \overbrace{\sum_{k=16}^{20} H_i}^{QPU4} + \overbrace{\sum_{k=21}^{25} H_i}^{QPU5} \quad (13)$$

This grouping reduces the calculation by a factor of 5. Now, this type of multi-threading can be performed through many quantum computers using a quantum controller. Furthermore, since each quantum computer may have different noise model, and the noise can be mitigated to obtain an accurate solution. As a result, the quantum controller can also perform noise/error mitigation.

The different processes in this example can be performed using quantum controller 216 in FIG. 2. This component can be configured to implement in processes such as those depicted in FIGS. 8-11.

Although the illustrative example is described with respect to solving a quantum chemistry problem, the process for solving this problem using subproblems as described in the examples can be applied to other applications other than quantum chemistry problems. For example, quantum problems such as a quantum physical problem simulating quantum physics, matrix inversions, solving sparse matrix linear equations, logistics problems, and other types of problems. In other words, these examples can be applied to both classical problems and specific quantum computing problems.

Thus, illustrative examples provide a method, apparatus, computer system, and computer program product for parallelizing quantum processes for processing a problem. A computer system identifies subproblems in the problem based on a structure of the problem. The computer system identifies quantum circuits in a set of quantum computers to process the subproblems. The computer system executes jobs on the quantum circuits to solve the subproblems.

The identification subproblems can enable selecting one of computers having properties that can run jobs for the particular subproblems. Thus, the subproblems can be run in quantum circuits on various quantum computers based on the characteristics of the subproblems and properties of the quantum computers. By parallelizing the running of quantum processes on the quantum circuits to solve the subproblems, the amount of time needed to solve a problem can be reduced. Further, problems that may be too large to run in a group computers can be run when broken up into subproblems.

Additionally, the different subproblems can be run on quantum computers that have properties that match or can take into account the attributes of subproblems. As result, the different quantum computers used do not have to be identical. Instead, on computers can be selected that have properties that can run jobs based on attributes for different subproblems.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for parallelizing quantum processes for processing a problem, the method comprising a computer system:
   identifying subproblems in the problem based on a structure of the problem;
   identifying attributes comprising at least one of: a precision level, a depth of quantum gates, or a cross talk error, respectively, for each subproblem in the subproblems;
   identifying, respectively for each subproblem in the subproblems, a number of quantum computers, in a set of quantum computers, comprising properties designed for processing attributes of the subproblem; and
   executing jobs in parallel on the set of quantum computers solving all the subproblems.

2. The method of claim 1, further comprising the computer system sending a result, from executing the jobs in parallel that is outside of a tolerance, to an optimization process.

3. The method of claim 1, further comprising:
   the properties comprising characteristics of: a number quantum circuits, a number of qubits available, or a depth of a quantum circuit.

4. The method of claim 1, wherein the subproblems are independent of each other, wherein a subproblem is independently solved from other subproblems.

5. The method of claim 1, wherein the problem is solving an eigenvalue problem for a matrix and wherein identifying, by the computer system, the subproblems in the problem based on the structure of the problem comprises:
   identifying, by the computer system, Pauli strings for the matrix; and
   placing, by the computer system, the Pauli strings into groups that form the subproblems, wherein the Pauli strings in a group can be run on a same quantum circuit.

6. The method of claim 1, further comprising the properties comprising a number of quantum circuits.

7. The method of claim 6, wherein the attributes further comprise a number of qubits determined by a size of a Pauli string forming a subproblem.

8. A parallel processing system configured to solve a quantum problem, wherein the parallel processing system comprises:
   a computer system; and
   a quantum controller in the computer system, wherein the quantum controller is configured to:
      identify subproblems in a problem based on a structure of the problem;

identify attributes that comprise at least one of: a precision level, a depth of quantum gates, or a cross talk error, respectively, for each subproblem in the subproblems;

identify, respectively for each subproblem in the subproblems, quantum circuits in a set of quantum computers that comprise properties designed to process the attributes of the subproblem; and execute jobs in parallel on the quantum circuits to solve the subproblems.

9. The parallel processing system of claim 8, wherein the quantum controller is further configured to send a result from executing the jobs to an optimization process.

10. The parallel processing system of claim 8, wherein the quantum controller is further configured to repeat execution of the jobs on the quantum circuits and solve the subproblems in response to a result that is outside of a tolerance.

11. The parallel processing system of claim 8, wherein the subproblems are independent of each other, wherein a subproblem is independently solved from other subproblems.

12. The parallel processing system of claim 8, wherein the problem is solving an eigenvalue problem for a matrix and wherein in identifying the subproblems in the problem based on the structure the problem, the quantum controller is configured to:

identifying Pauli strings for the matrix; and placing the Pauli strings into groups that form the subproblems, wherein the Pauli strings in a group can be run on a same quantum circuit.

13. The parallel processing system of claim 8, wherein in identifying the quantum circuits to process the subproblems, the quantum controller is configured to:

identifying attributes of the subproblems; and selecting the set of quantum computers having quantum circuits to handle the attributes of the subproblems.

14. The parallel processing system of claim 13, wherein the attributes are selected from at least one of a number of qubits, number of quantum circuits, a precision level, a depth of the quantum circuits, or a cross talk error.

15. A computer program product configured to run parallel quantum processes, wherein the computer program product comprises a non-transitory computer readable storage medium that comprises program code embodied therewith, the program code configured for execution by a computer system to cause the computer system to:

identify subproblems in a problem based on a structure of the problem;

identify attributes that comprise at least one of: a precision level, a depth of quantum gates, or a cross talk error, respectively, for each subproblem in the subproblems;

identify, respectively for each subproblem in the subproblems, quantum circuits in a set of quantum computers that comprise properties designed to process the attributes of the subproblem; and execute jobs in parallel on the quantum circuits that solve the subproblems.

16. The computer program product of claim 15, wherein the program code is further configured to send a result of an execution of the jobs in parallel to an optimization process.

17. The computer program product of claim 16, wherein the optimization process comprises a repeated, by the computer system, execution of the jobs on the quantum circuits to solve the subproblems in response a result that is outside of a tolerance.

18. The computer program product of claim 15, wherein the subproblems are independent of each other, wherein a subproblem is independently solved from other subproblems.

19. The computer program product of claim 15, wherein the problem is solving an eigenvalue problem for a matrix and wherein the program code is further configured to identify Pauli strings for the matrix; and place the Pauli strings into groups that form the subproblems, wherein the Pauli strings in a group can be run on a same quantum circuit.

20. The computer program product of claim 15, wherein the attributes further comprise a number of qubits.

* * * * *

UNITED STATES PATENT AND TRADEMARK OFFICE
CERTIFICATE OF CORRECTION

| | | |
|---|---|---|
| PATENT NO. | : 12,223,343 B2 | Page 1 of 1 |
| APPLICATION NO. | : 17/649034 | |
| DATED | : February 11, 2025 | |
| INVENTOR(S) | : Nam H. Nguyen, Richard J. Thompson and Marna M. Kagele | |

It is certified that error appears in the above-identified patent and that said Letters Patent is hereby corrected as shown below:

In the Claims

Column 20, Lines 40-41, Claim 3 correct "number quantum" to read -- number of quantum --,
Column 21, Line 25, Claim 12 correct "structure the" to read -- structure of the --,
Column 21, Line 39, Claim 14 correct "qubits, number" to read -- qubits, a number --,
Column 22, Line 25, Claim 17 correct "response a" to read -- response to a --.

Signed and Sealed this
Sixth Day of May, 2025

Coke Morgan Stewart
*Acting Director of the United States Patent and Trademark Office*